(12) United States Patent
McCague et al.

(10) Patent No.: US 7,768,143 B2
(45) Date of Patent: Aug. 3, 2010

(54) MOVEMENT AND POWER GENERATION APPARATUS

(76) Inventors: James McCague, 23 Richmond Road, Retford, Nottingham DN22 6SJ (GB); Simon Condry, 15 Moorgate Park, Retford, Nottinghamshire DN22 6th (GB)

( * ) Notice: Subject to any disclaimer, the term of this patent is extended or adjusted under 35 U.S.C. 154(b) by 0 days.

(21) Appl. No.: 12/257,554

(22) Filed: Oct. 24, 2008

(65) Prior Publication Data

US 2009/0072540 A1 Mar. 19, 2009

Related U.S. Application Data

(63) Continuation of application No. PCT/GB2007/001498, filed on Apr. 24, 2007.

(30) Foreign Application Priority Data

Apr. 25, 2006 (GB) .................................. 0608128.5

(51) Int. Cl.
*F03B 13/10* (2006.01)
*F03B 13/12* (2006.01)
*H02P 9/04* (2006.01)

(52) U.S. Cl. ........................................... 290/42; 290/53
(58) Field of Classification Search .................. 290/42, 290/54; 405/76; 417/332, 330; 60/398, 60/495, 496, 497, 501; 415/7; 416/7
See application file for complete search history.

(56) References Cited

U.S. PATENT DOCUMENTS

| | | | | |
|---|---|---|---|---|
| 163,451 A * | 5/1875 | Buckner | ...................... | 60/502 |
| 852,232 A * | 4/1907 | Kohler | ........................ | 60/398 |
| 1,098,208 A * | 5/1914 | Abbott | ........................ | 60/507 |
| 1,184,362 A * | 5/1916 | Lindquist | ..................... | 60/501 |
| 1,393,472 A * | 10/1921 | Williams | ...................... | 290/42 |
| 1,403,702 A * | 1/1922 | Melvin | ........................ | 60/496 |
| 1,864,499 A * | 6/1932 | Grigsby | ....................... | 74/130 |
| 3,746,875 A | 7/1973 | Donatelli | | |
| 3,930,168 A * | 12/1975 | Tornabene | ................... | 290/53 |
| 3,964,264 A * | 6/1976 | Tornabene | ................... | 405/76 |
| 4,009,395 A | 2/1977 | Long et al. | | |
| 4,034,231 A * | 7/1977 | Conn et al. | .................... | 290/53 |
| 4,392,060 A * | 7/1983 | Ivy | ............................. | 290/53 |
| 4,599,858 A * | 7/1986 | La Stella et al. | .............. | 60/497 |
| 5,176,552 A * | 1/1993 | Kuboyama et al. | ........... | 441/16 |

(Continued)

FOREIGN PATENT DOCUMENTS

DE    3912943    11/1989

(Continued)

*Primary Examiner*—Julio Cesar Gonzalez
(74) *Attorney, Agent, or Firm*—Ronald E. Smith; Smith & Hopen, P.A.

(57) ABSTRACT

The invention relates to apparatus which allows the movement of a body of water, such as that created by waves and/or a swell in the sea, to be utilized to generate power. The apparatus includes a first member in the form of a float, which is connected to a second member and at least one rotatable means connected to a power generator. In one embodiment the second member is connected with and supported on the first member while the rotatable member and power generator are provided at a relatively fixed location and coupled to second member such that relative movement of the second member with respect to the rotatable means is used to cause the generation of power.

14 Claims, 14 Drawing Sheets

U.S. PATENT DOCUMENTS 5,424,582 A * 6/1995 Trepl et al. .................... 290/53
2003/0091393 A1    5/2003 Flory

FOREIGN PATENT DOCUMENTS

| FR | 2260000 | 8/1975 |
| GB | 2239293 A * | 6/1991 |
| JP | 56044465 A * | 4/1981 |
| JP | 60056178 A * | 4/1985 |

* cited by examiner

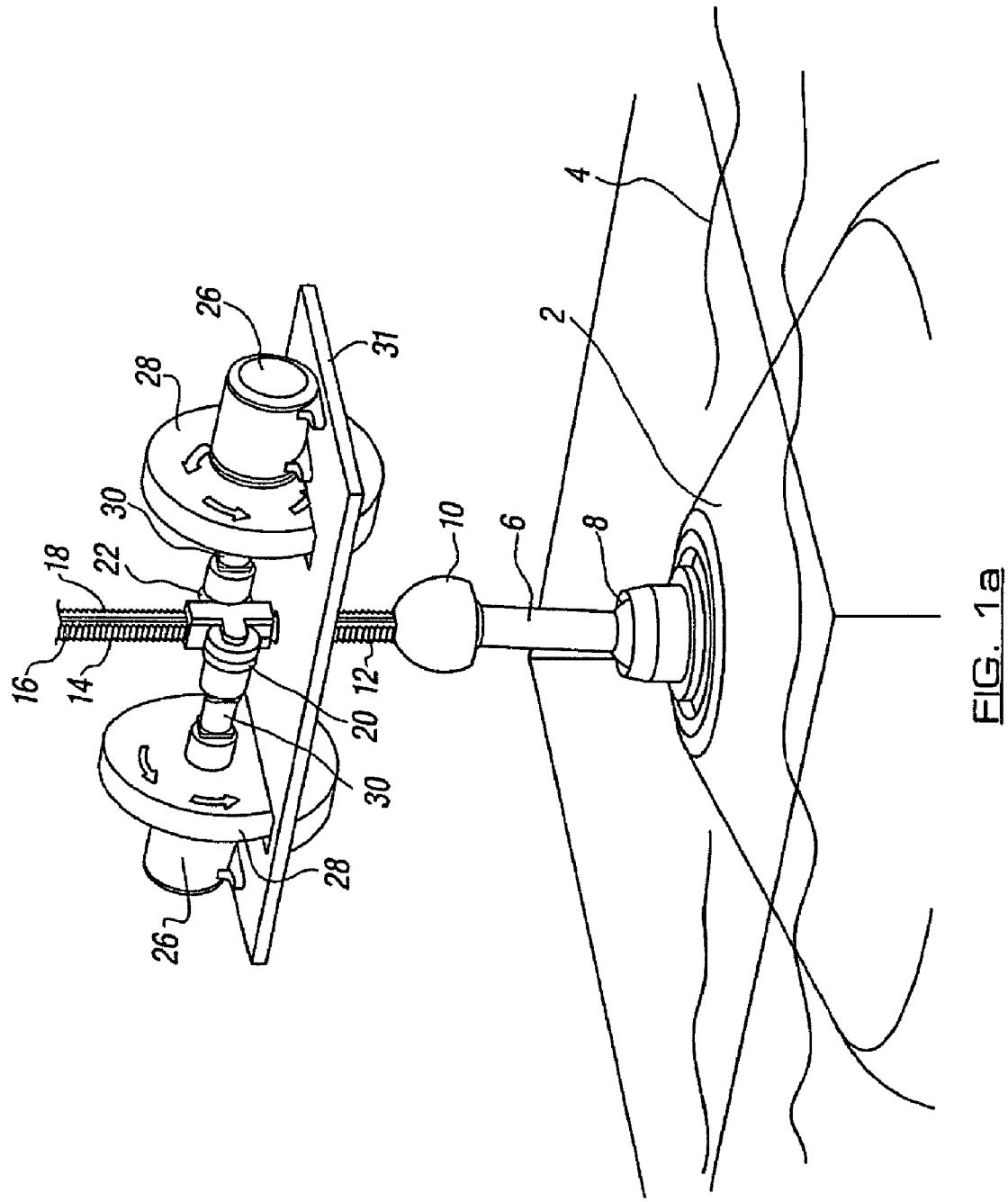

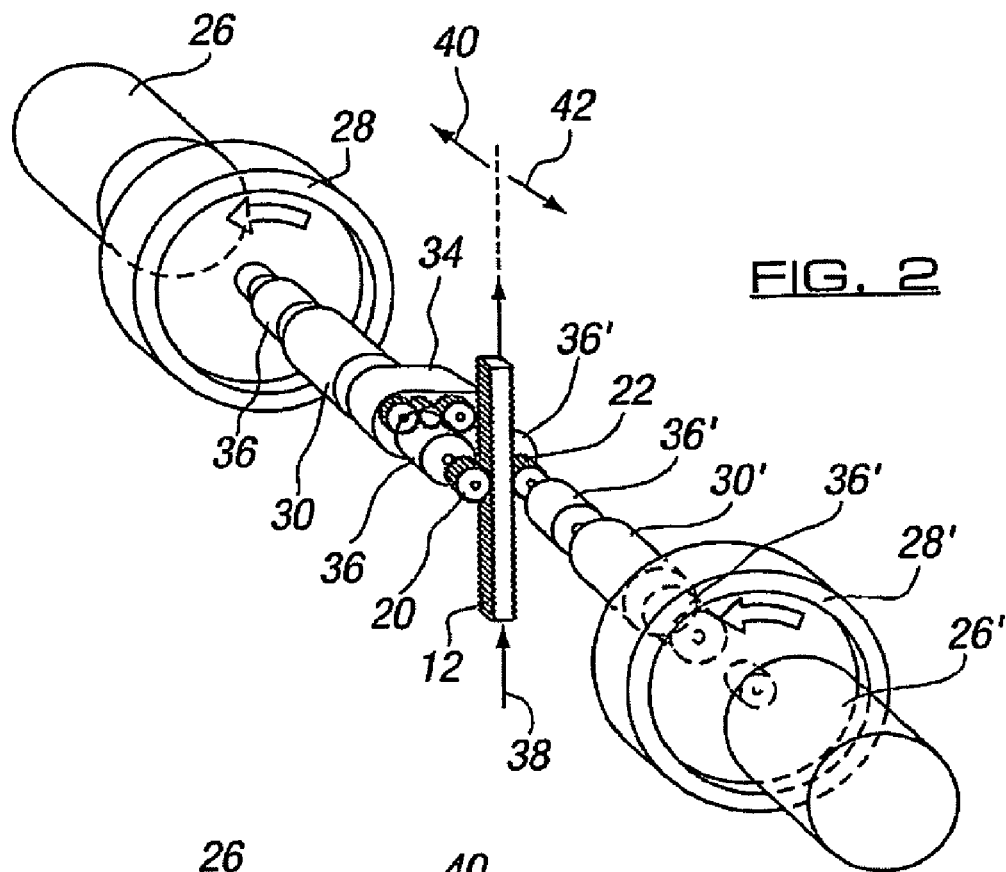
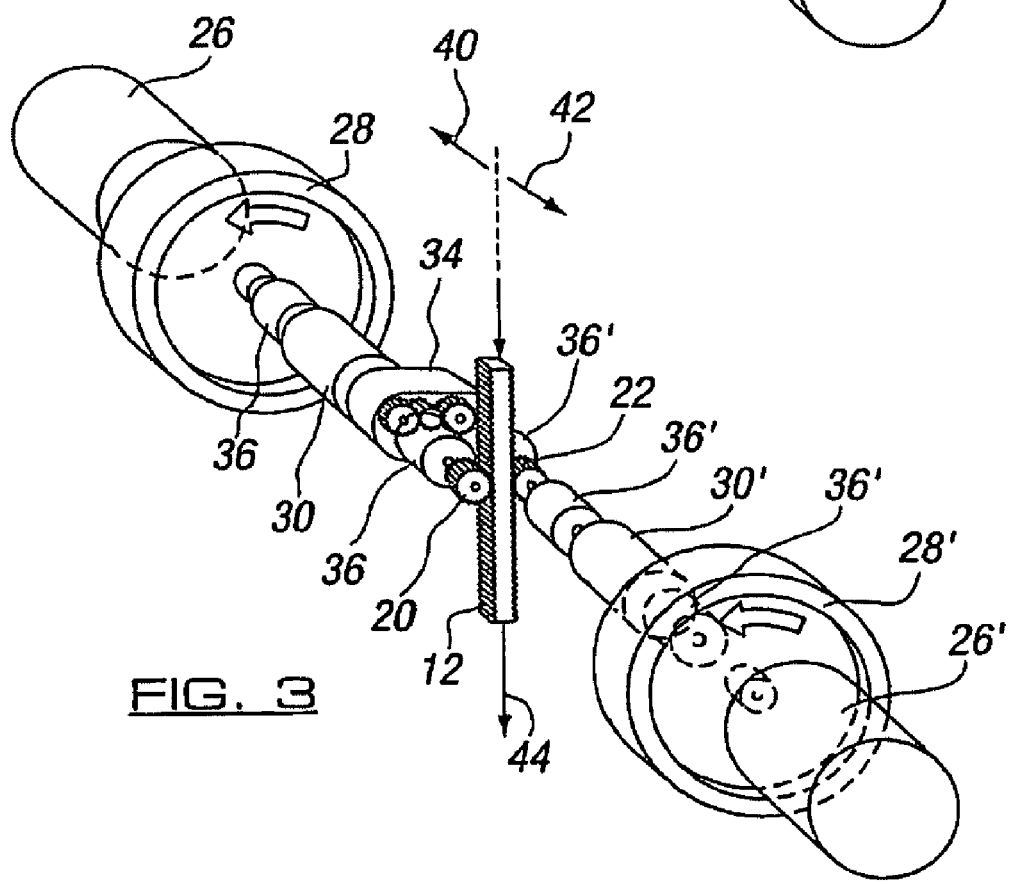

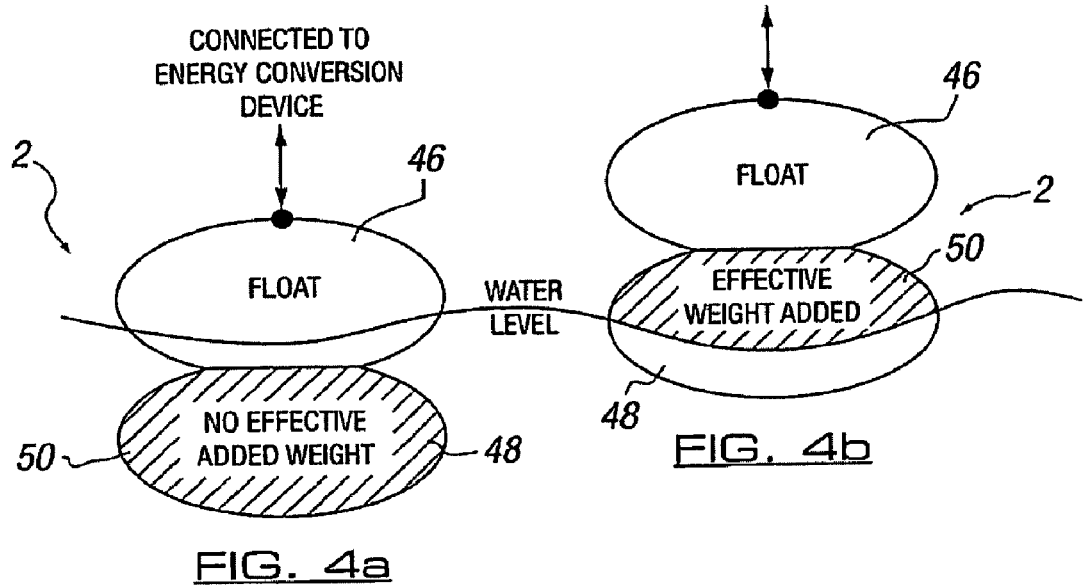
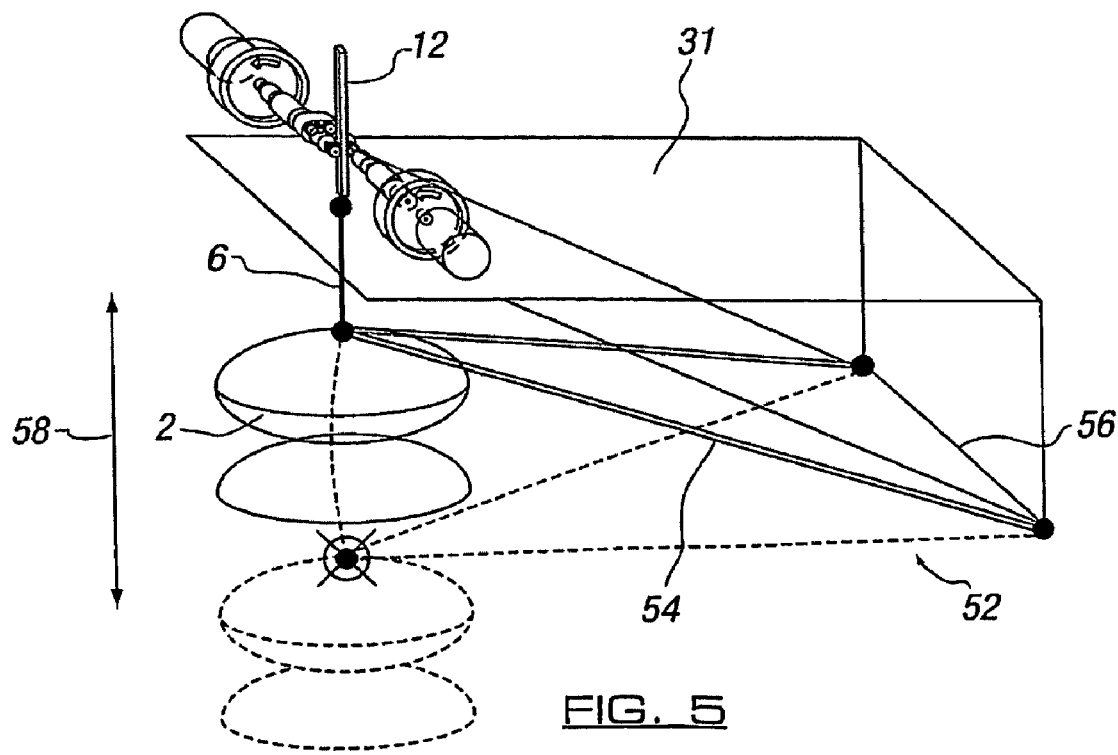

MOVEMENT AND POWER GENERATION APPARATUS

CROSS REFERENCE TO RELATED APPLICATIONS

This application is a continuation of PCT Application No. PCT/GB2007/001498, filed Apr. 24, 2007, which claims benefit of Great Britain Application No. GB0608128.5, filed Apr. 25, 2006.

FIELD OF THE INVENTION

The invention to which this application relates is to apparatus which can be used to harness movement of a body of water in at least a first direction and allow the transmission of said movement into a second form of movement which is more useful for a specified purpose such as, but not necessarily exclusively, to allow power generation.

SUMMARY OF THE INVENTION

In particular, although again not necessarily exclusively, the apparatus is for use in respect to first movement as a linear component of movement of the body of water and the said movement is translated into a second, rotational, movement. The apparatus is herein described with regard to movement of a body of water such as the sea and the transmission of the said movement to allow the operation of power generating means such as to allow electricity to be generated and/or to power movement of further apparatus connected thereto, such as a pump. It will be appreciated that the generation of power from natural resources is becoming an increasingly important area and the invention as herein describe, represents a significant mean to allow such generation. Although the invention is described with regard to use of the apparatus for power generation, it should be appreciated that this is for illustrative purpose only and in a non-limiting manner and the apparatus may be used for other purposes.

The provision of electricity power generation is conventionally by the burning of oil, gas or coal fuels which causes the depletion of non-renewable resources and is environmentally unfriendly. Alternative power generation means are constantly being searched for. One form is nuclear power generation but this has well known disadvantages and therefore there is resistance to utilization of the same.

The use of natural resources is another option and the use of solar generation, wind power and sea power, is known but, at the present time, is performed on a relatively small scale and each have their own inherent problems.

An aim of the present invention is to provide apparatus which can be used to harness movement of a body of water and to allow at least in one embodiment, the generation of power as a result of use of said apparatus. A further aim is to provide the apparatus in a form which is robust to movement of the body of water and/or provide control means which allow the apparatus to be controlled with regard to the movement of the body of water.

In a first aspect of the invention, there is provided apparatus for use in contact with a body of water, said apparatus comprising a member provided to be located at or close to the surface of the body of water, at least a second member and at least one rotatable means provided in moveable engagement therewith wherein one of the second member or rotatable means is connected with the said first member to move under the influence of the same and to move with respect to the other of the second member or rotatable meant to create a driving force and/or create power.

In one embodiment the second member is elongate in form and provides relative movement in a substantially linear direction. In one embodiment the second member moves under the influence of the first member and said movement causes, in turn, rotation of the rotatable means In an alternative embodiment the rotatable means is connected to the first member and moves along the second member under the influence of the first member movement.

In one embodiment, the second member and rotatable means are connected by meshed teeth and in one embodiment, the second member is provided with a row of teeth along at least one elongate face thereof and the rotatable means includes one or more cogs with teeth on the outer surface thereof. The arrangement con be provided as a rack and pinion arrangement. In one embodiment there are provided a series of racks along the second member and a rotatable means meshed with each of said racks.

In one embodiment two racks are provided a first rack and rotatable member to allow transfer of movement from the upwards movement of the second member, and a second rack and rotatable member to allow transfer of movement from the downwards movement of the second member under the influence of the movement of the body of water on the first member.

Typically, the teeth are of a dimension so as to allow the same to mesh yet allow the same to be tolerant to movement components in directions other than that as desired.

In one embodiment, the first member is provided as a float such that the same is positioned to float on the surface of the body of water.

In one embodiment, the first member is provided with, or is attached to, ballast which, preferably, when the ballast is in the body of water, has no effective weight but if the member rises above the body of water then the weight of the ballast draws the first member back into the body of water.

In one embodiment, the first and second members are provided to be movable under the influence of the body of water and the rotatable means is provided in a substantially fixed position with respect to the body of water such that relative movement of the second member with respect to the rotatable means causes the movement of the rotatable means.

Alternatively, the second member is provided as part of a structure with respect to which the first member and attached rotatable means are provided to be movable as a result of movement of the body of water.

In one embodiment, the second member is provided in connection with a plurality of rotatable means, at spaced locations with regard to the same. In one example a rotatable means can be provided on each opposing side of the second member for movement along teeth formed on each of said sides and any of the elongate sides of the second member can be provided with teeth to locate rotatable means therealong. In each case, the rotatable means are provided to be movable under the influence of relative movement between the second member and the rotatable means.

In one embodiment, the rotatable means are provided in connection with a power generation, in one embodiment via a flywheel, wherein the rotational movement is used for the generation of power.

Typically, suitable gearing is provided between the rotatable means and the power generator so as to allow the benefit of the rotatable means to be maximized in terms of benefit to the power generation.

In one embodiment, the relative movement between the second member and the rotatable means is in a reciprocal manner in the linear plane, and the rotatable means are connected to the power generator such that relative movement in both directions causes rotational movement of the rotatable means which can be transmitted to the power generator. Thus, if, as is typically the case, the movement of the body of water is in the form of waves, or a swell at the surface, then the upward and downward movement of the first member as a result of the waves or swell, can be utilized to cause rotatable movement.

In one embodiment, where a plurality of rotatable means are provided, the same are provided as part of a common mounting such that the same move uniformly with respect to the second member.

Typically, there is provided a mechanical connection between the first and second members, said connection including at least one but preferably a plurality of universal joints such as to allow movement components other than the linear movement of the second member which occur between the first and second members to be accommodated and removed from significant and potentially damaging influence on the movement of the second member and rotatable means. This therefore ensures and prevents damage to the connection between the second member and the rotatable means.

In one embodiment, the apparatus includes limiting means such that if, for example, the rotatable means reach a location at or adjacent to the extremity of the second member, which may, for example, be caused by severe movement of the body of water in storms, the limiting acts to prevent subsequent movement of the rotatable means thereby retaining the rotatable means, in one embodiment, at the extremity position and therefore preventing further operation of the apparatus until the same is released when weather conditions allow.

In addition, or alternatively, the apparatus includes detection mean to detect the conditions of the body of water and, upon predetermined limit values being reached, operation of the apparatus is stopped.

It is envisaged that the apparatus in accordance with the invention will be of particular use in the sea where there is normal movement of the body of water under the influence of both tidal and wind conditions to create waves or swell.

In one embodiment, the apparatus is provided as an integral unit with certain components movable under the influence of the body of water with respect to the unit so as to allow the creation of the relative movement between the members and the rotatable means. In one embodiment the units are modular in that as many units can be provided as are required to generate a specific power requirement. It should also be appreciated that the apparatus as herein described is scalable to meet specific power consumption and environmental requirements.

Preferably, the first member is guided in its movement by being located with respect to guide means. In one embodiment the guide means may be a cylinder or tube inside which the first member and along with the same moves under the influence of the movement of the body of water. Alternatively the guide means may be in the form of one or more rails.

In a further aspect of the invention, there is provided apparatus for generating power, said apparatus including a first member provided to lie in a body of water, a second member located with at least one rotatable means, said second member or rotatable means moveable under the influence of the first member to create relative movement between the said second member and rotatable means to translate linear to rotational movement, and said rotational movement used to operate a power generating means coupled to the rotating means.

In one embodiment, the second member is a linear rack and the rotatable means are provide to rotate along the rack to move position along the rack and allow the transfer of linear movement to rotational movement.

In one embodiment, the connection between the power generating means and the rotatable means is via a unidirectional clutch which allows gearboxes, fly wheels and the electrical generators to rotate in only one direction even though upward and downward movement of the second member is harnessed to move the rotational means.

Typically, when the first member rises under the influence of the body of water, the one or more unidirectional clutches connected to the wave upward movement engage and the gearbox will come under load and increase the shaft revolutions thereby driving a fly wheel and subsequently the electrical power generator. On another of the rotatable means, on the gravity or wave downward side of the member, at this time the unidirectional clutch or clutches connected thereto, will freewheel and therefore the gravitational gearbox need never be reversed. This freewheeling therefore eliminates any gearbox drag from slowing the flywheel and ultimately the electrical generator connected thereto.

When the wave reverses, i.e. the first member and second member move downwardly the one or more unidirectional clutches on the gravity driven side will engage and therefore the gearbox will come under load and increase the shaft revolutions, therefore driving the flywheel and therefore the gravity electrical generator. The wave upward driven side rotatable means will rotate in an opposite direction and the unidirectional clutch connected thereto will freewheel, therefore the gravitational gearbox need never be reversed and the unidirectional clutch between the gearbox and flywheel will freewheel therefore eliminating any gearbox drag from slowing the flywheel and ultimately the electrical generator.

In one embodiment the gearing connections used to transfer rotatable movement from the second member in the upward movement may be different in terms of configuration with respect to the gearing arrangement for the downward movement in order to take into account differences in the extent and/or speed of movement in the two directions.

In one embodiment the power generator to which the rotatable means is connected is used to generate electricity and includes an output shaft connected to an alternator. The alternator may be connected to an inverter connected to DC capacitors and in turn connected to an electricity supply network or alternatively to apparatus to be powered directly thereby.

In an alternative embodiment the apparatus is connected to power a pump such as a hydraulic pump.

Specific embodiments of the invention will now be described with reference to the accompanying drawings, wherein:

BRIEF DESCRIPTION OF THE DRAWINGS

FIGS. 1a-1c illustrate a first embodiment of apparatus in accordance with the invention;

FIG. 2 illustrates operation of the apparatus on a wave front;

FIG. 3 illustrates operation of the apparatus in a wave reverse;

FIGS. 4a and 4b illustrate one embodiment of the first member;

FIG. 5 illustrates one embodiment of an integral unit in accordance with the invention:

DETAILED DESCRIPTION OF THE PREFERRED EMBODIMENT

Figure 1B:
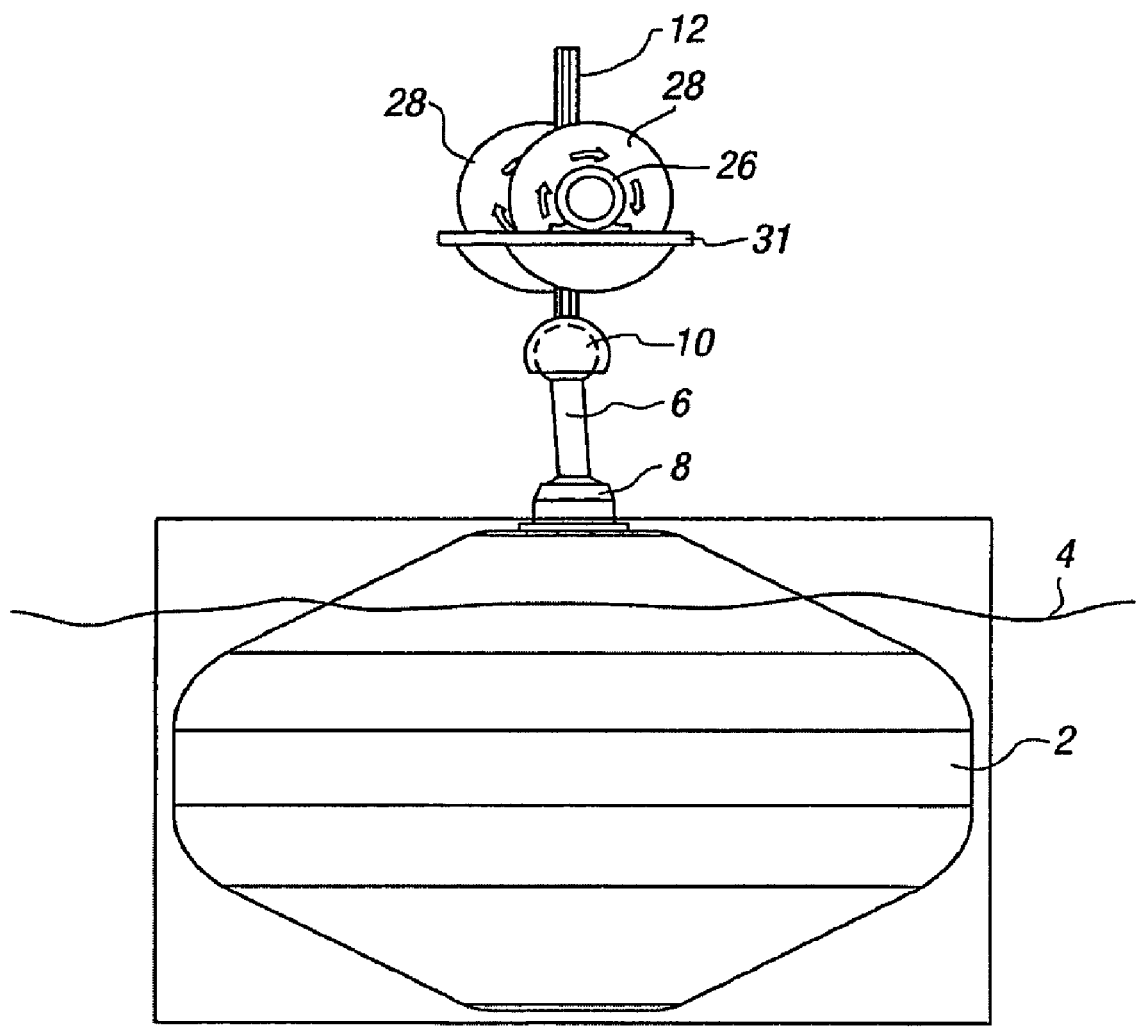
Figure 1C:
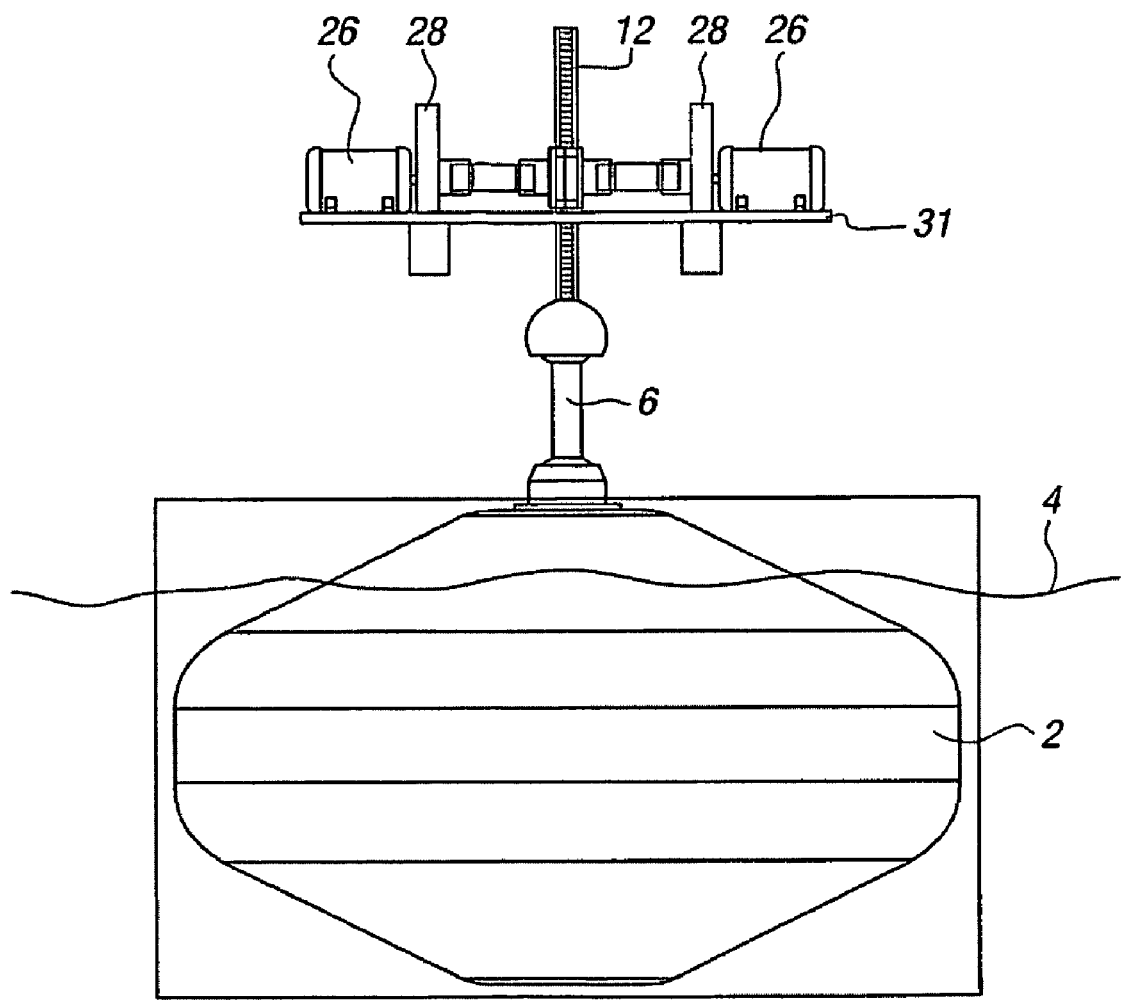

Referring firstly to FIGS. 1a to 1c, there is illustrated apparatus in accordance with one embodiment of the invention. In this case, the apparatus comprises a first member in the form of a float 2 which is provided to lie at or adjacent to the surface of a body of water 4, as shown. The preferred arrangement of the first member will be described subsequently. The first member is connected to the remainder of the apparatus by a connector assembly 6 which comprises a first universal joint 8 and a second universal joint 10. The second universal joint 10 is connected in turn to a second member of the apparatus 12. The second member, in this embodiment, is formed as a double-sided rack with teeth 14 provided on opposing sides 16 and 18 and along the length thereof. Rotatable means, in the form of pinions 20, 22 are provided for each of the racks and mesh with the teeth thereon. Each of the rotatable means is connected to a power generator 26 via a flywheel 28 and gearing mechanisms 30 which will be described subsequently.

In use therefore, the first member acts as a float, and typically includes ballast, and therefore acts generally to move in a manner which includes a substantially vertical component under the influence of the movement of waves in the body of water. The other movement components are taken into account and minimized by the provision of the universal joints such that the movement component acting on the second member is substantially linear and, when the mounting 31 is fitted to a stationary structure, is preferably in the vertical direction. The movement of the second member causes rotation of the rotatable means which are provided at a fixed location on mounting 31 as the second member moves with respect to the mounting.

Rotation of each of the rotatable means in a particular direction is arranged to cause rotation of the fly wheel 28 to which the same is connected and hence generation of electricity can be achieved at the generators 26 due to the rotation. It will therefore be appreciated that the rotatable mean, flywheel and electricity generators, in this embodiment, are provided in a fixed position with respect to the first and second members so as to create the relative movement.

Referring now to FIG. 2, there is illustrated the apparatus in a more schematic manner but the same components are referred to with the same reference numerals. Firstly, it will be seen how there is provided a power transfer unit 34 and unidirectional clutches 36, 36' connected to each of the drive means. In addition, the gearboxes 30 are provided between each of the drive means and the flywheels and one of the unidirectional clutches is positioned between the gearbox and the flywheels on each side.

Thus, when the apparatus is used in the sea, the action of the waves can be harnessed to create electricity. FIG. 2 shows the occurrence where the upward wave front influences the said first member 2 (not shown) and therefore causes the second member 12 to move upwardly as indicated by the arrows 38 in FIG. 2. The unidirectional clutches 36 which are on the upward wave driven side 40 of the apparatus engage. As a result, the gearbox 30 comes under load and increases the shaft revolutions therefore driving the fly wheel 28 and therefore the electrical generator 26 connected thereto. The opposing rotatable means 22 at the gravity side 42 rotates in an opposite direction and so in order to prevent the same hindering the operation of the generator 26, the unidirectional clutches 36' connected to rotatable means 22 will freewheel and as a result the gravitational gearbox 30' is never reverse and the fly wheel 28' will freewheel therefore eliminating any gearbox drag from slowing the flywheel 28 and ultimately the electrical generator 26.

FIG. 3 illustrates the arrangement where the wave is receding and hence the second member 12 will move downwardly as indicated by arrows 44. In this case, the unidirectional clutches 36' on the gravity driven side 42 will engage and therefore the gravitational gearbox 30' will come under load to drive the flywheel 28' and the generator 26'.

On the side 40, the unidirectional clutches 36 will freewheel therefore eliminating any gearbox 30 drag from slowing the flywheel 28' and also the electrical generator 26'.

Thus it will be appreciated that the movement of the second member under the rise and fall of the water can be used to create electricity. However, the fall of the wave will typically only be used if the first member descends at a sufficient rate to allow gravity to add kinetic energy to the wave and flywheel.

It should also be appreciated that this particular arrangement is optional and in other, simpler arrangements, only the rise of the second member need be used to generate electricity.

FIGS. 4a and 4b illustrate the manner in which the first member 2 may be created to comprise an upper part 46 which acts as a float and a second part 48 which acts as ballast. In one embodiment, the ballast may comprise water 50. Thus, the first member acts as a buoyancy device and when in the neutral state of being forced down by a downward force as shown in FIG. 4a, the water in the ballast tank has neutral buoyancy. However, once the first member is elevated from the water level 4 as shown in FIG. 4b, the ballast adds weight to the member, therefore allowing more energy to be extracted from the reverse of the wave as it falls.

FIG. 5 illustrates in schematic form, a proposed unit 52 which incorporates the apparatus in accordance with the invention and which shows how the first member 2 is movable via the connector 6 along with the second member 12 and moved with respect to the remainder of the apparatus mounting 31 which is provided as part of the fixed unit. The A frame 54 allows the buoyancy device to ride over the wave in a fixed plane as illustrated by the second position of the same shown in broken lines about pivot axis 56 and as indicated by arrow 58 therefore exerting minimal side forces to the frame.

A further embodiment of the invention is illustrated with reference to FIGS. 6-8b.

Figure 6:
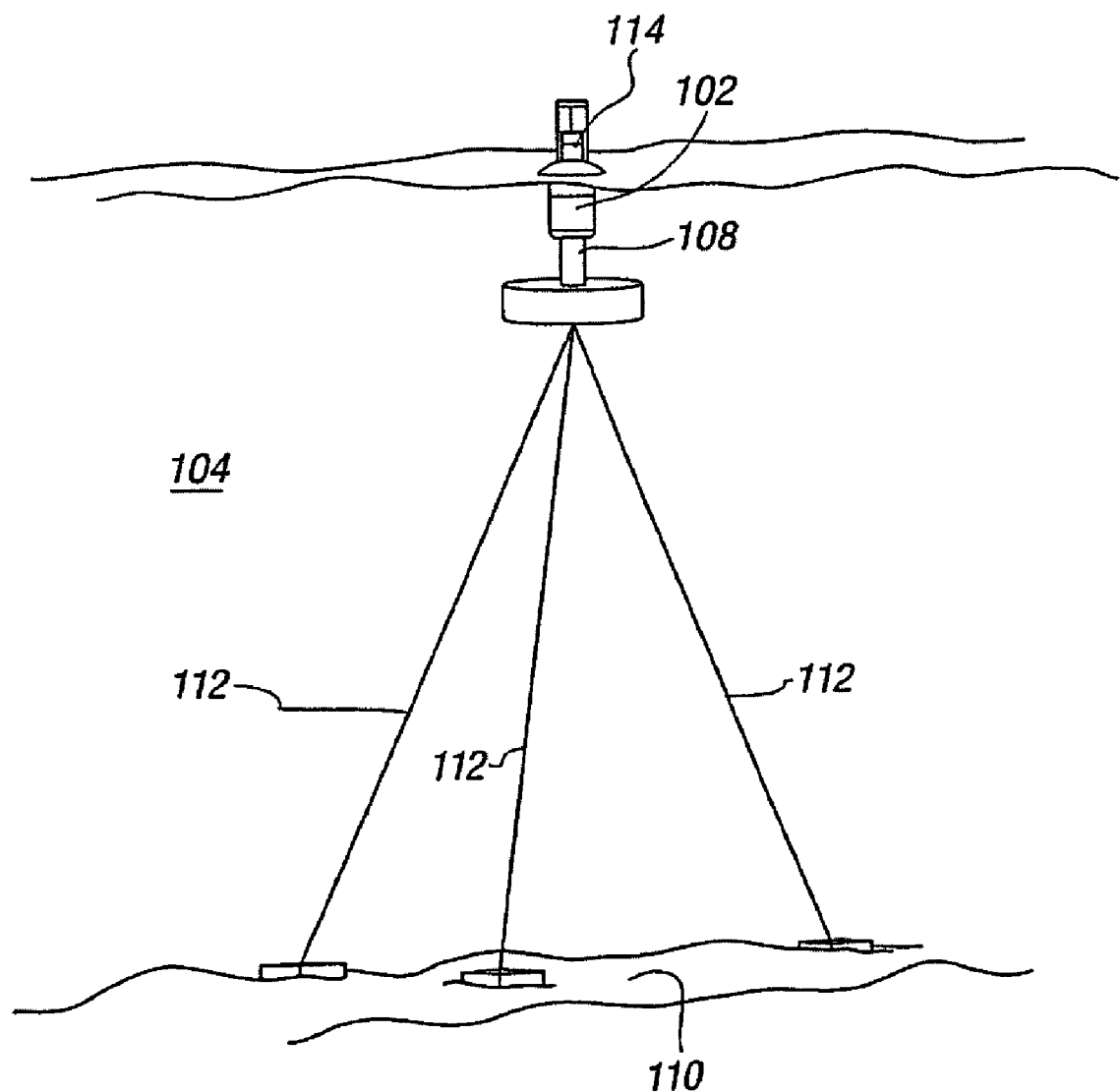
FIG. 6 illustrates a further embodiment of the invention.

Referring firstly to FIG. 6, there is provided a first member 102 in the form of a float at the surface of a body of water 104. The first member 106 is mounted with respect to a support frame 108 which is moored to the sea bed 110 via anchor ropes 112 and this arrangement is particularly well suited to deep sea environments.

Figure 8A:
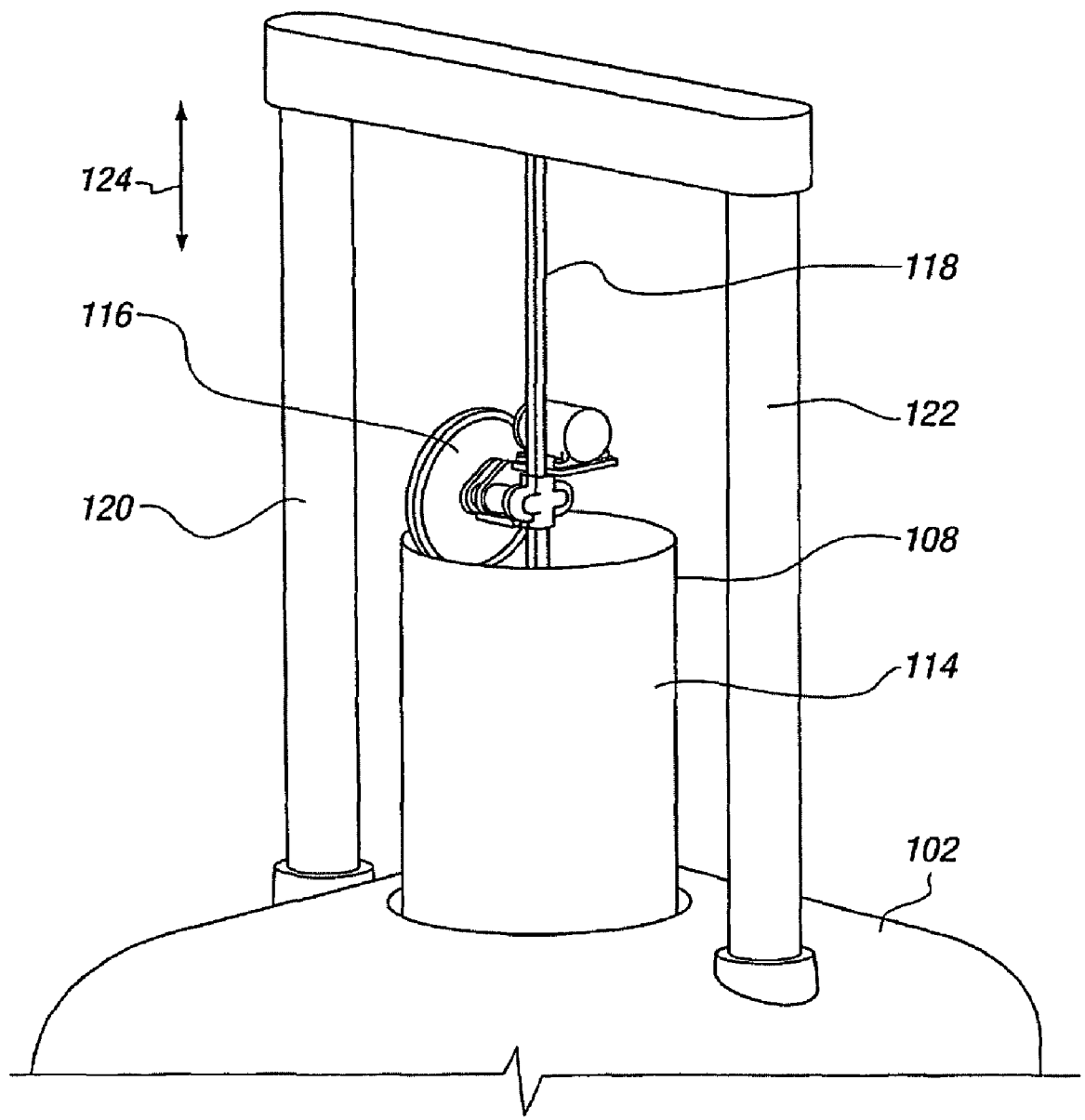
FIGS. 8a and 8b illustrate further views of the embodiment of FIGS. 6-7b.
Figure 8B:
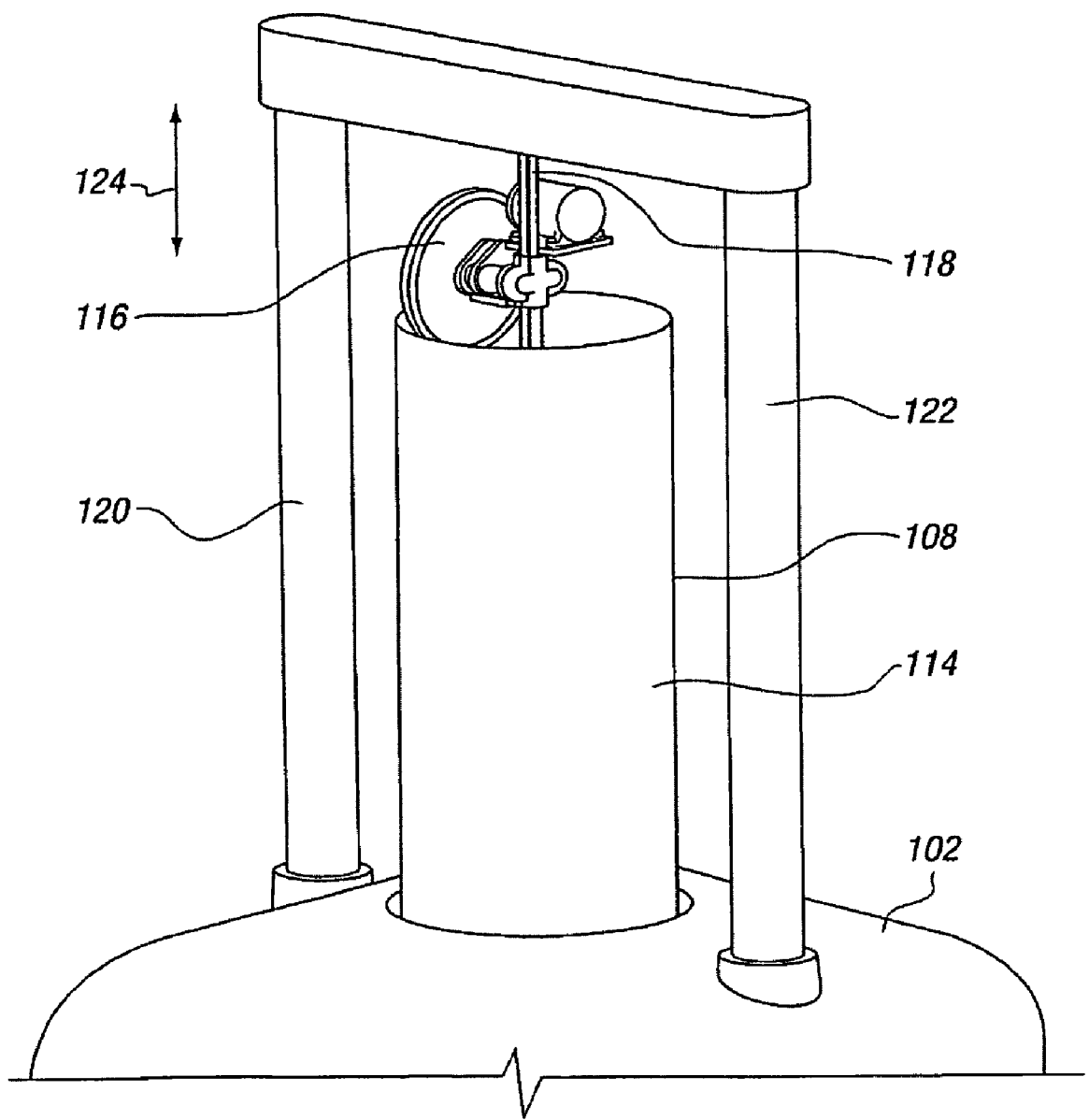

Referring now to FIGS. 8a and 8b, the arrangement between the first member 102 and frame 108 is shown in more detail. In this case the support frame includes a cylinder 114 to which is mounted rotatable means 116 which will be described subsequently. The first member 102 is connected to the second member 118 which is a linear rack member with which the rotatable means engage. The second member 118 is mounted to the first member 102 via supports 120, 122.

Thus, in this embodiment there is relative movement between the first and second members, which are under the influence of the water, and the rotatable means 116 in the direction of arrow 124. FIGS. 8a and 8b illustrate differing positions of the rotatable means on the second member 118.

Figure 7A:
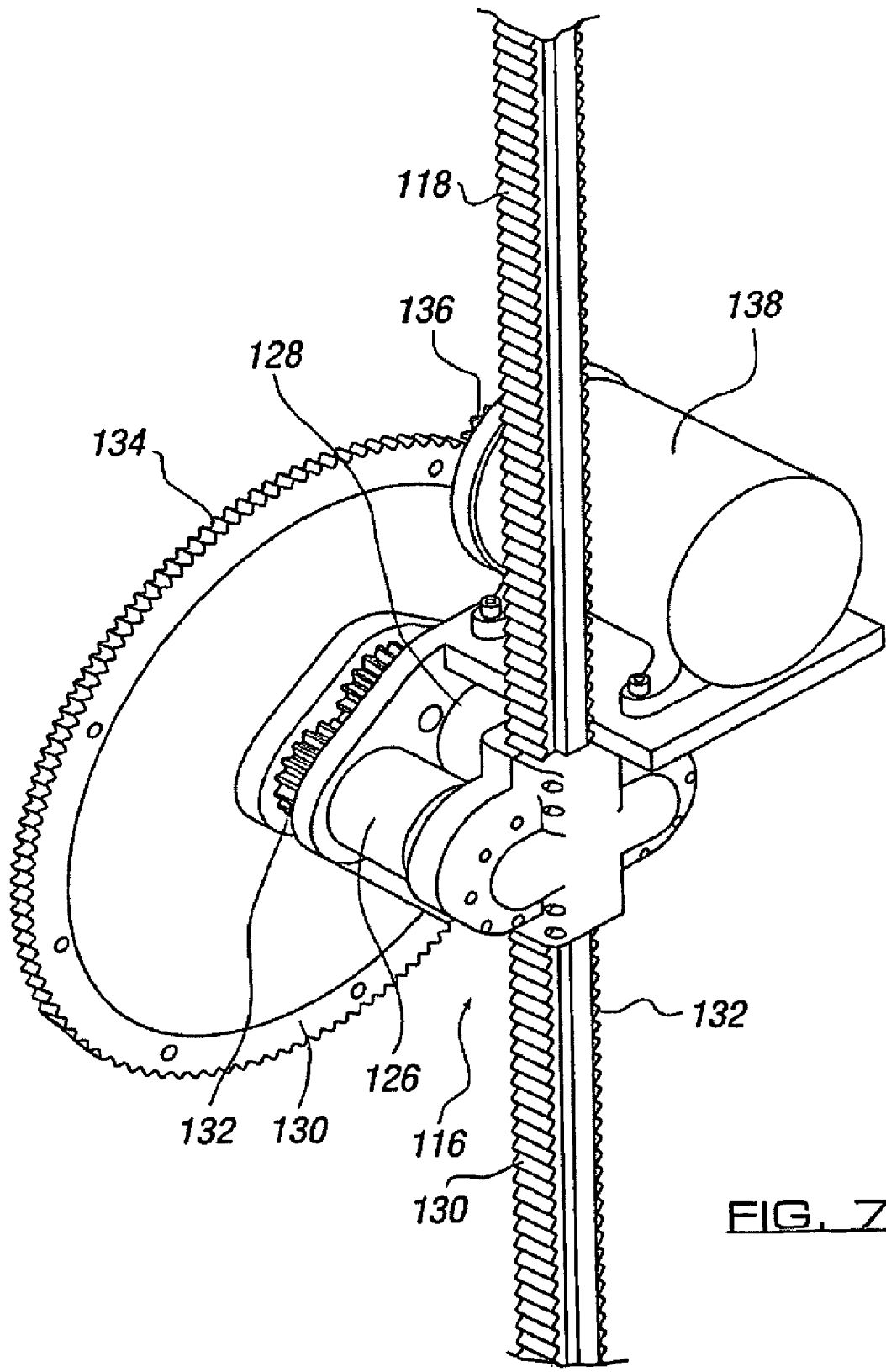
FIGS. 7a and 7b illustrate a detailed view of apparatus of part of FIG. 6.
Figure 7B:
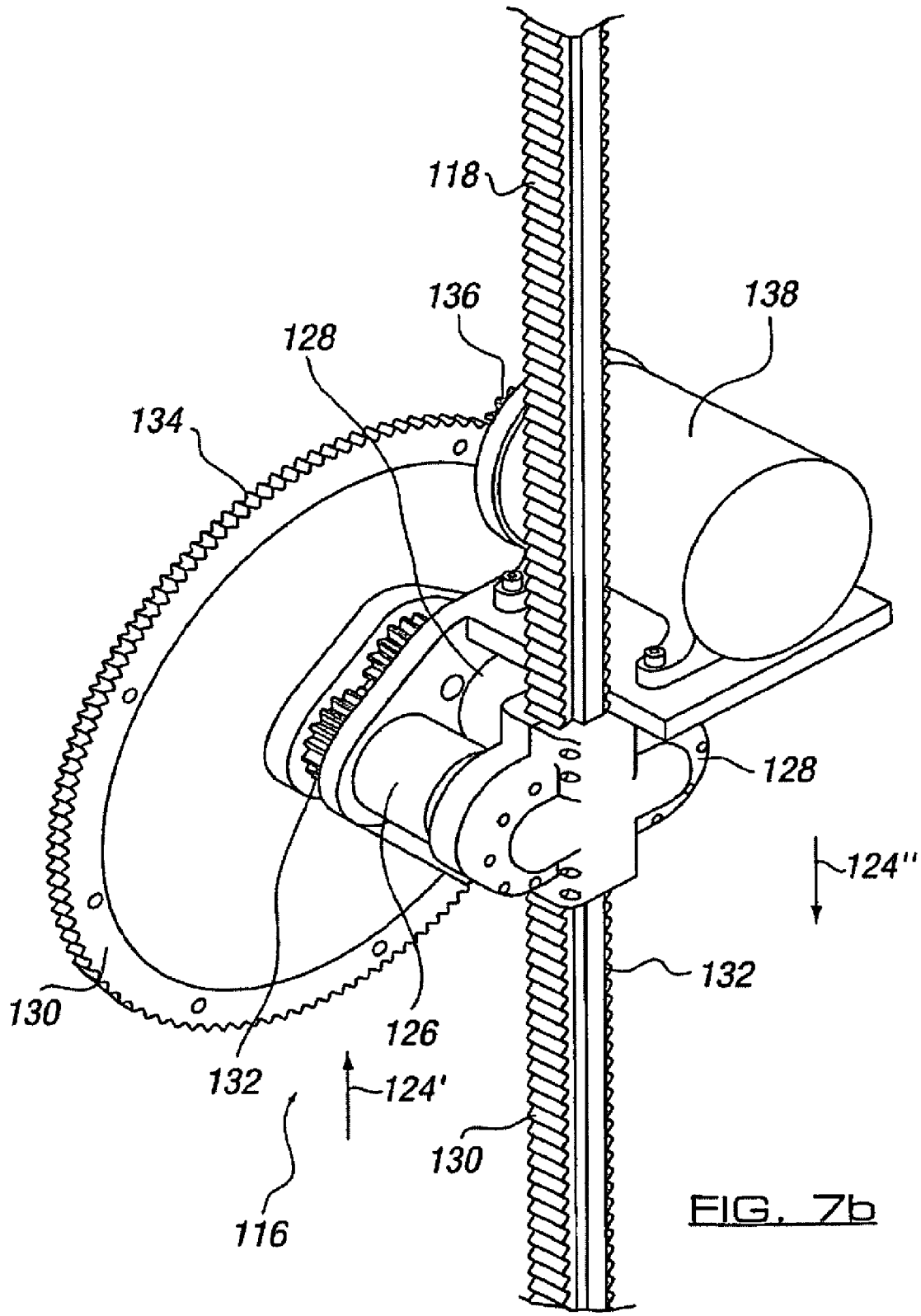

FIGS. 7a and 7b illustrate in greater detail the relationship between the rotatable means 116 and the second member 118, as well as greater detail of this embodiment of the rotatable means 116. In this case, engagement between the two clutches 126, 128 of the rotatable means with the second member 118 is achieved via the respective teeth formations 130, 132. The clutches can be selectively engaged such that when the relative movement between the rotatable means 116 and the second member is in the direction 124', the clutch 126 is engaged and clutch 128 in disengaged. When the movement is in the direction 124", clutch 126 is disengaged and clutch 128 is engaged. The engaged clutch at any time transmits rotational movement to the fly wheel 130 to cause the same to rotate via gearing 132. In this embodiment the flywheel is provided with teeth 134 which, as the flywheel rotates mesh with a cog 136 to cause the same to rotate and drive the motor 138 and hence case the generation of electrical power or another resultant force which can be harnessed for specific purposes.

Figure 9:
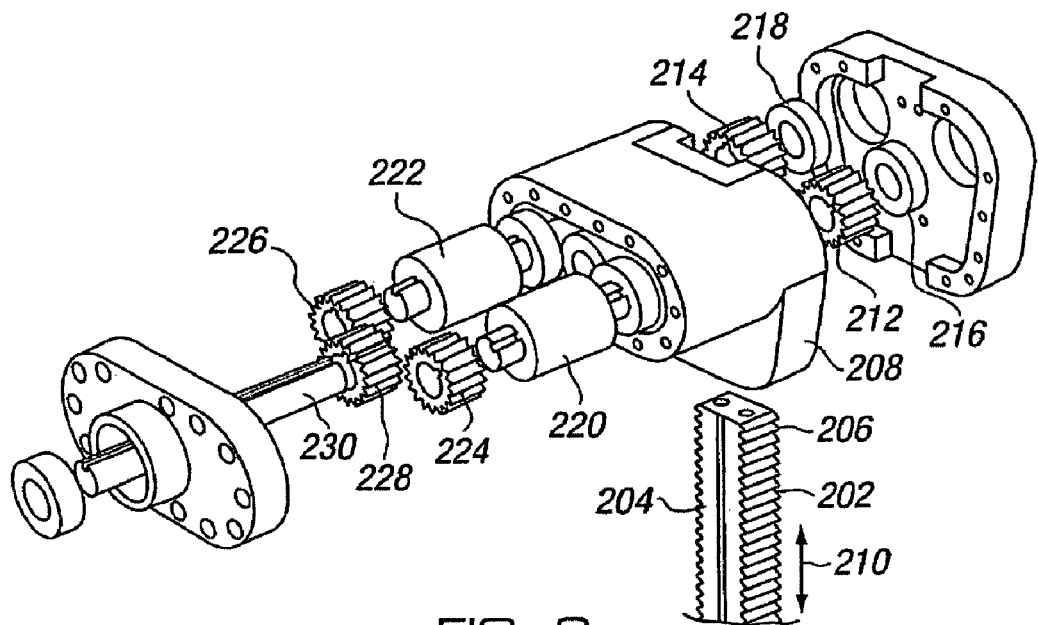
FIG. 9 illustrates a further arrangement of components of apparatus according to the invention.

FIG. 9 illustrates specific arrangements of apparatus in accordance with the invention. The figure shows the top portion of the second member 202 which is provided, in this case, with first and second racks 204, 206. The second member 202 is received within a housing 208 of the rotatable means assembly and is movable in a direction 210 with respect to the housing. Located within respective bearings 216, 218 and these allow the movement of the second member to be translated into rotational movement, and are in turn connected to respective unidirectional clutches 220, 222. As already discussed, each of the unidirectional clutches is arranged so as to provide driven movement of a respective step-up gear 224, 226 but only with respect to one direction of movement. For example, unidirectional gear 220 only provides driven movement when the member 204 movies in the upward component of the movement and unidirectional clutch 222 only provides driven movement in the downward component of the movement 210 of the second member 204. The movement which is created is transferred via third gear 228 to an output shaft 230 which in turn is connected to a power generator (now shown). However, if the power generator is to be used to convert the drive from the output shaft into electricity, the power generator will typically comprises an alternator 232 connected to a network supply or directly to apparatus to be powered, typically via an inverter and DC capacitors. The load which is created on the apparatus may be adjustable to suite specific operating requirements at any given time.

One important consideration in using the apparatus is to ensure that the apparatus is correctly mounted such that the relative movement of the first member and second member connected thereto, with respect of the remainder of the apparatus can be properly harnessed so as to create the drive of the output shaft.

Figure 10:
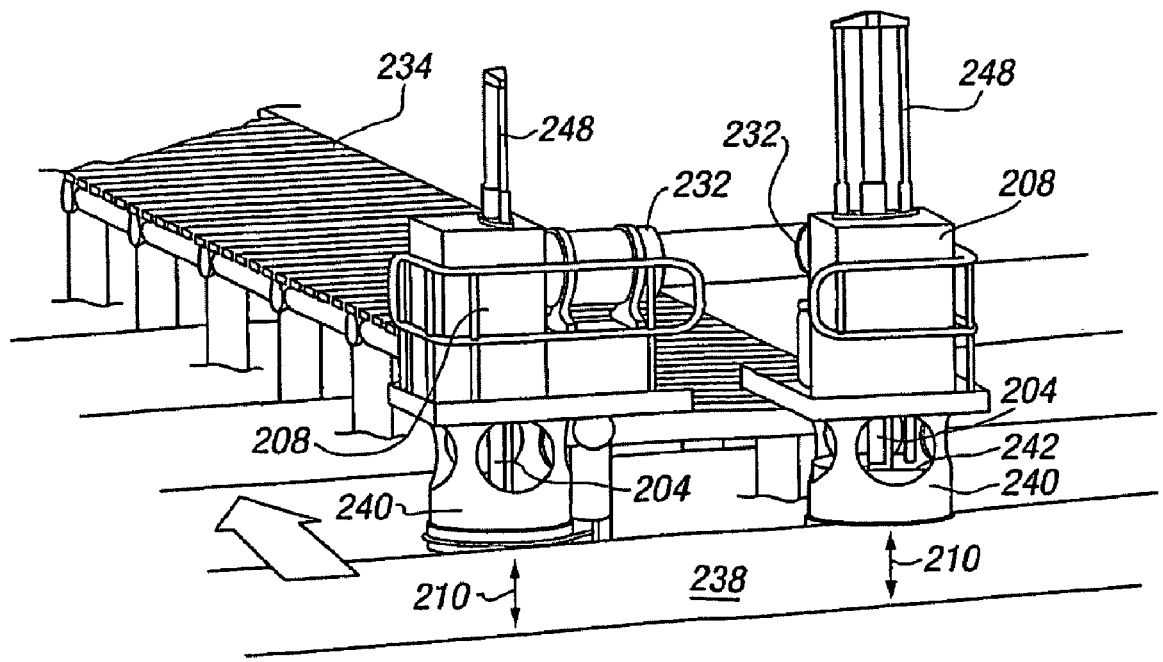
FIGS. 10 and 11 illustrate two possible embodiments for fixing the apparatus to existing structures.
Figure 11:
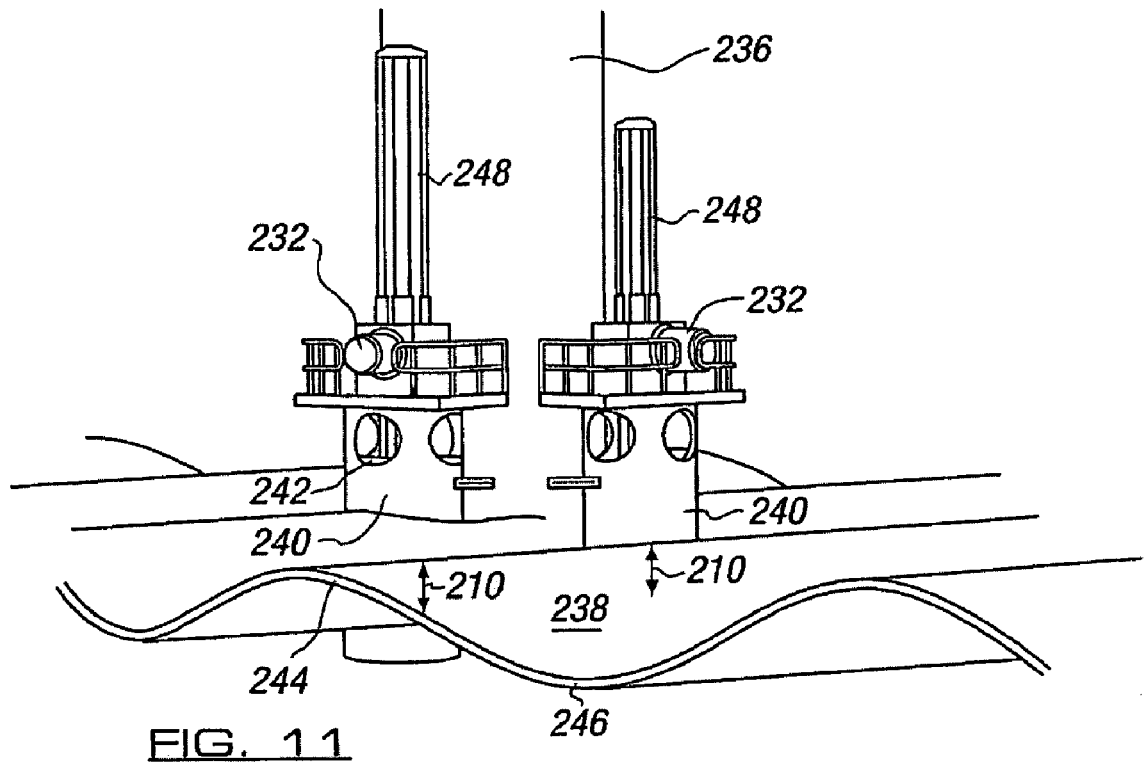

FIGS. 10 and 11 illustrate one possible embodiment in which there is provided a pier structure in FIG. 10 and a platform leg structure 236 in FIG. 11. In each case, two sets of apparatus in accordance with the invention are shown and it will be appreciated that by attaching the same to the pier and leg respectively, then, as both are located within the body of water 238 so the movement of the body of water can be harnessed by the apparatus. In the arrangement shown, it is illustrated the fact that there is provided a guide cylinder 240 within which the first member, or float 242 is located and is able to move in a direction 210 under the influence of the movement of the body of water movement.

It should therefore be appreciated that as illustrated in FIG. 11 where the top 244 and bottom 246 of a wave is shown, that when the bottom of the wave 246 is at the bottom of the guide 240, the float or first member 242 will be at its lowest position in the guide 240 and when the top of the wave 244 is at the guide, the float or first member 242 will be at its highest position in the guide.

The apparatus also includes a column 248 which allows the guided movement of the second member as it moves under the influence of the first member through the housing 208. Also shown are the alternators 232 which are connected to each of the housing 208. It will therefore be appreciated that in this arrangement, the housings, rotatable means therein, alternator and support assembly and guide means 240, are all securely fixed to structures 234 or 236 and it is the second member 204 and the first member 242 which are movable under the direction influence of the movement of the body of water.

Figure 12:
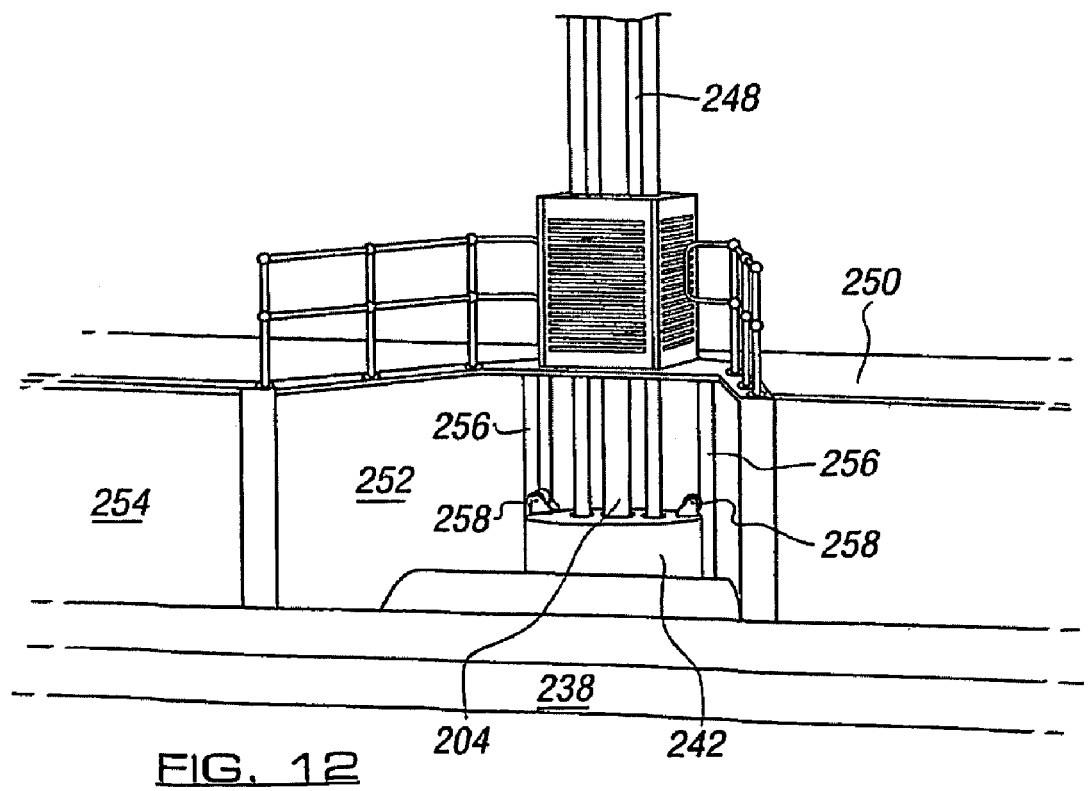
FIG. 12 illustrates a further fixing arrangement for apparatus in accordance with the invention.

FIG. 12 illustrates a further embodiment in which the apparatus is connected to a harbor wall or a sea wall 250. The same components can be used, and where they have been used are provided with the same reference numeral as in FIGS. 9 to 11. In this case, no guide cylinder 240 is required and instead, the first member 242 is mounted in a recessed area 252 which is recessed from the front face 254 of the harbor wall. However, in this case, alternative to the guide means 240, guide rails 256 are provided and the first member 242 is provided with wheels 258 which are located on these guide rails and move therealong to therefore guide the movement of the first member and the second member 204 under the influence of the body of water 238.

Figure 13:
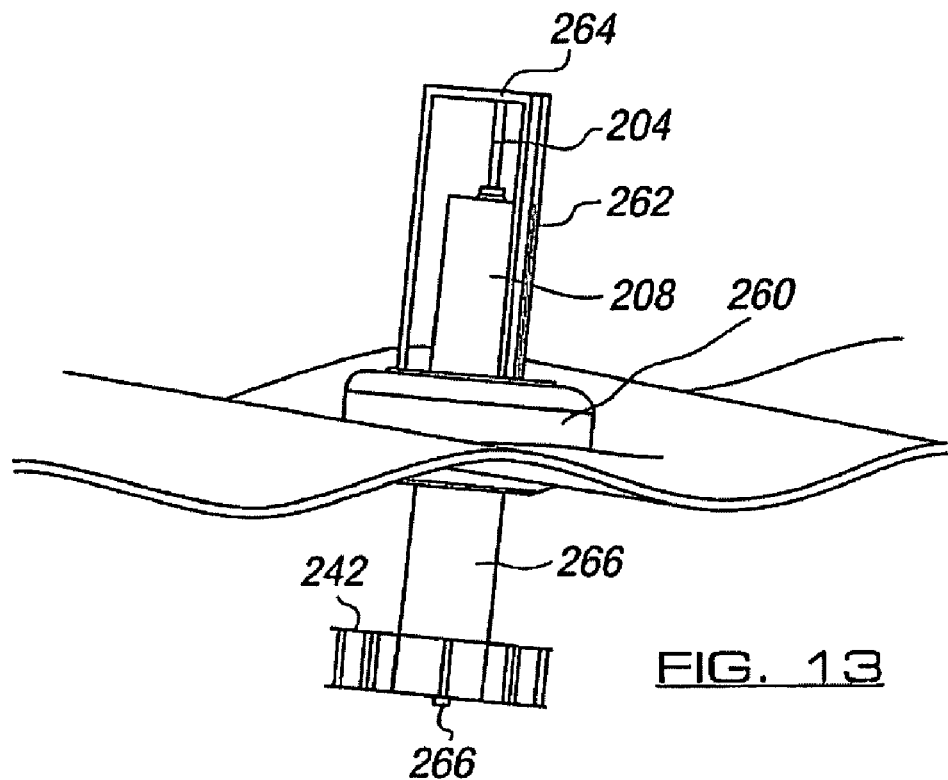
FIG. 13 illustrates an arrangement for supporting the apparatus in a body of water in accordance with a further embodiment.

FIG. 13 illustrates an alternative arrangement which can be used where permanent structures such as harbor walls and piers are not available and therefore allows the apparatus to be used out to sea. In this case, a buoyancy device first member 260 is provided which serves to support in a fixed position with respect thereto, a structure 262 on which a yoke 264 and power transfer shaft or second member with rack 204 which penetrates the central column 266, are located. The central column has dampening plates 242 within the water which dampen the column movement against the mooring means 265. A housing 208 is provided as part of the column within which the rotatable means, gearing and unidirectional shafts as well as the output shaft may be provided. Thus in this case the first and second members move under the influence of the water and the second member which penetrates into the housing 208 moves and engages with the rotatable means located within the central column 266. The mooring point 265 lows the buoy to be moored to a sea bed or other means so as to maintain the same in a known position.

Figure 14A:
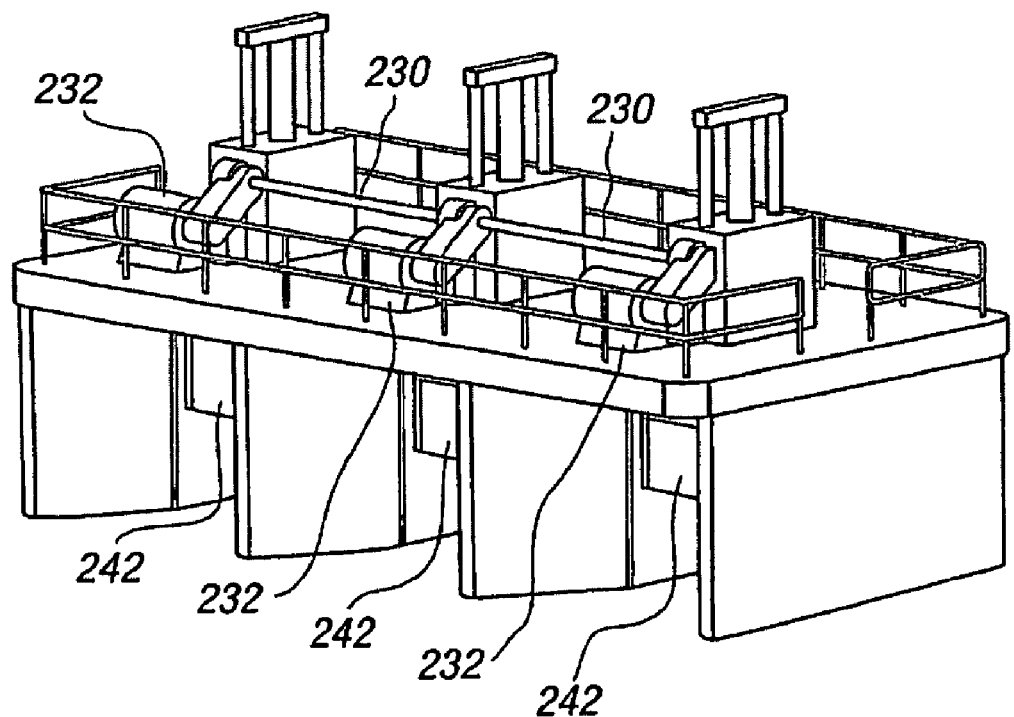
FIGS. 14a-14c illustrate a further arrangement of implementing the apparatus in accordance with the invention.
Figure 14B:
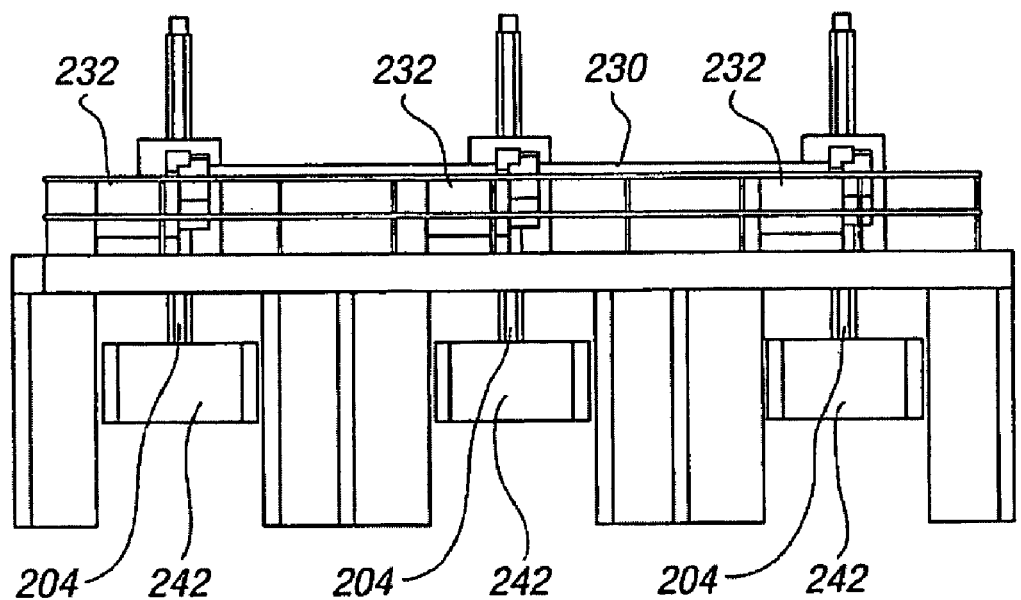
Figure 14C:
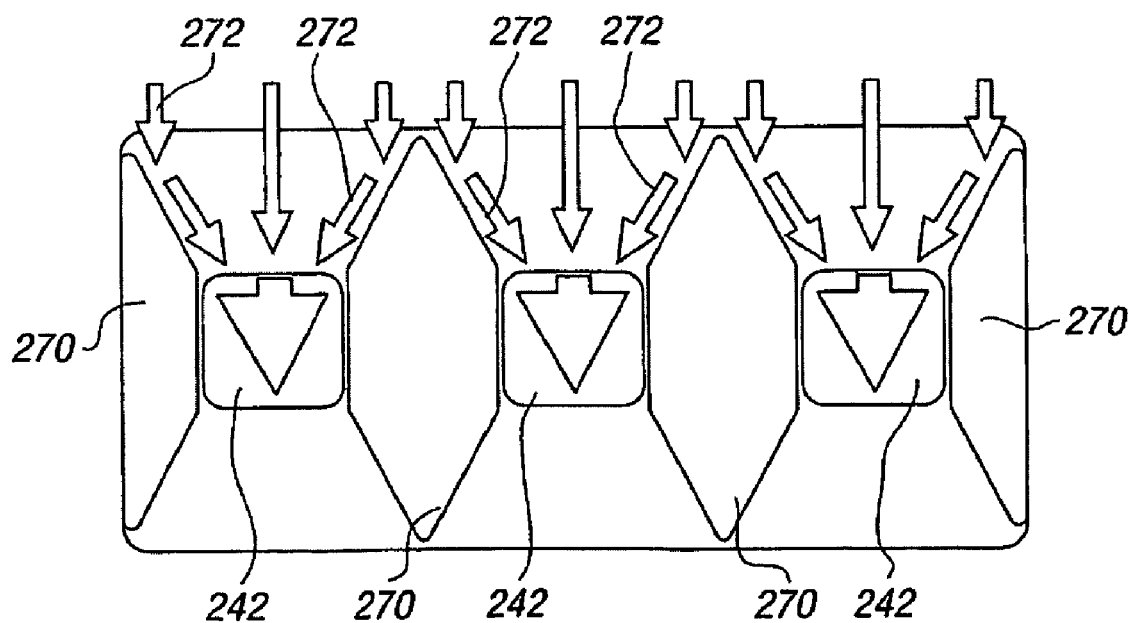

FIGS. 14a-14c illustrate a further arrangement, which may be mounted on a fixed structure or more likely on a movable structure such as a barge or ship so that the same can then be used out to sea. In this case, three sets of apparatus are provided and each will operate in a similar manner to that already described. However in this case, the three are connected to a common output shaft 230 with the three output shafts in turn connected to each of three alternators 232. The alternators may selectively be engaged independently to allow optimum energy absorption and the provision of three smaller floats or first member 242 may be selected to allow the effect of relatively small waves and hence small distances of movement, to still be harnessed in the generation of power.

In addition, the floats or first members 242 can be provided in shaped water movement influencing channels such as shown in the plan view of FIG. 14c. In this figure it is seen that the channels formation under the surface of the water, can cause, by the selective formation of protrusions 270, to control the flow of the water and/or the degree of rise and fall of the body of water to be increased by deflecting the water into a particular location where the floats or first members are located. This is indicated by the arrows 272 which serve to show the flow of water towards the position of each of the respective floats or first members 242.

In any embodiment, the apparatus can be connected to suitable transmission lines to allow the power generated to be carried to the location where it is to be used.

The present invention therefore provides efficient and practically implementable apparatus to allow the harnessing of movement of a body of water in the generation of power.

What is claimed is:

1. Apparatus for use in contact with a body of water, said apparatus comprising a first member provided to be located at or close to the surface of the body of water, at least a second member and at least one rotatable means provided in movable engagement therewith wherein one of the second member or rotatable means is connected with said first member to move under the influence of the same and to move with respect to the other of the second member or rotatable means to create a driving force and/or create power characterised in that the second member includes first and second racks, rotatable means provided to move along and engage with each of said racks, said rotatable means connected to first and second clutches, said first and second clutches arranged such that movement along the racks in a first direction causes said first clutch to drive a first output shaft connected to a first power generation means and movement along the racks in the opposing direction causes said second clutch to drive said second output shaft connected to said second power generation means wherein movement in the first direction is as a result of an upward movement caused by a wave or swell of the body of water and movement in an opposing direction is a downward movement as a result of the wave or swell of the body of water and the apparatus is provided with means to control the extent of movement between the first and second members which is created by the body of water.

2. Apparatus according to claim 1 wherein the second member is elongate in form and moves in a substantially linear direction along its longitudinal axis.

3. Apparatus according to claim 1 wherein the second member moves under the influence of the first member and said movement causes rotation of the rotatable means.

4. Apparatus according to claim 1 wherein the rotatable means is connected to the first member and moves along the second member under the influence of the first member movement.

5. Apparatus according to claim 1 wherein teeth are provided on the rotatable means and are of a dimension so as to allow the same to mesh with the rack and allow the same to be tolerant to other movement components.

6. Apparatus according to claim 1 wherein the first member is a float such that the same is positioned to float adjacent to or on the surface of the body of water.

7. Apparatus according to claim 6 wherein-, the first member is provided with, or is attached to, ballast, such that when the ballast is in the body of water the ballast has no effective weight but if the member rises above the body of water then the weight of the ballast acts to draw the first member back into the body of water.

8. Apparatus according to claim 1 wherein the second member is provided as part of a structure with respect to which the first member and attached rotatable means are provided to be movable as a result of movement of the body of water.

9. Apparatus according to claim 1 wherein the connection to the power generation means includes at least one flywheel and the rotational movement is used for the generation of power.

10. Apparatus according to claim 1 wherein gearing is provided between the rotatable means and the power generator so as to allow the movement of the rotatable means to be maximized in terms of benefit to the power which can be generated.

11. Apparatus according to claim 1 wherein relative movement in the first and opposing directions causes rotational movement of the rotatable means which is transmitted to the power generator via the output shaft.

12. Apparatus according to claim 1, wherein the apparatus includes detection means to detect the conditions of the body of water and, upon certain predefined limits being reached, operation of the apparatus is stopped, or otherwise controlled.

13. Apparatus according to claim 1 wherein there is provided a mechanical connection between the first and second members, said connection including at least one universal joint.

14. Apparatus according to claim 1 wherein the first member is located in the body of water with the second member extending upwardly therefrom, with the power generator and rotatable means located in a position on a moored or stationary assembly and coupled to the second member.

* * * * *